United States Patent
Niu et al.

(10) Patent No.: US 12,323,866 B2
(45) Date of Patent: Jun. 3, 2025

(54) METHOD, DEVICE, AND SYSTEM FOR CELL MEASUREMENT AND REPORT IN WIRELESS NETWORKS

(71) Applicant: ZTE Corporation, Shenzhen (CN)

(72) Inventors: Li Niu, Shenzhen (CN); Bo Dai, Shenzhen (CN); Xiubin Sha, Shenzhen (CN); Ting Lu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 369 days.

(21) Appl. No.: 17/887,695

(22) Filed: Aug. 15, 2022

(65) Prior Publication Data

US 2022/0394576 A1 Dec. 8, 2022

Related U.S. Application Data

(63) Continuation of application No. PCT/CN2020/122322, filed on Oct. 21, 2020.

(51) Int. Cl.
*H04W 36/00* (2009.01)
*H04B 17/318* (2015.01)
*H04W 76/28* (2018.01)

(52) U.S. Cl.
CPC ...... *H04W 36/0085* (2018.08); *H04B 17/318* (2015.01); *H04W 76/28* (2018.02)

(58) Field of Classification Search
CPC ... H04W 36/0085; H04W 76/28; H04W 8/24; H04W 36/0094; H04W 48/12; H04W 36/0088; H04B 17/318; Y02D 30/70
See application file for complete search history.

(56) References Cited

U.S. PATENT DOCUMENTS

2016/0073304 A1* 3/2016 Dahlén ............ H04W 36/0085
                                                455/437
2016/0127994 A1* 5/2016 Cho ................. H04W 52/0222
                                                370/311

(Continued)

FOREIGN PATENT DOCUMENTS

| CN | 110012497 A | 7/2019 |
|---|---|---|
| EP | 3668151 A1 | 6/2020 |
| WO | WO 2019/222942 A1 | 11/2019 |

OTHER PUBLICATIONS

International Search Report and Written Opinion of International Application No. PCT/CN2020122322 dated Jun. 29, 2021, 8 pages.

(Continued)

*Primary Examiner* — Abdullahi Ahmed
(74) *Attorney, Agent, or Firm* — Crowell & Moring LLP

(57) ABSTRACT

This disclosure relates generally to dynamically configure cell measurement triggering condition for a UE in a wireless communication network. Performed by a UE in a network, the method including: receiving cell measurement triggering information from a first network element in the network, the cell measurement triggering information comprising a set of predetermined values for a UE parameter and a set of triggering conditions for cell measurements corresponding to the set of predetermined values; determining a current value of the UE parameter for the UE; identifying a cell measurement triggering condition among the set of triggering conditions based on the current value of the UE parameter for the UE and the cell measurement triggering information; determining if the cell measurement triggering condition is met by the UE; and in response to the cell measurement triggering condition being met, performing the cell measurement.

19 Claims, 5 Drawing Sheets

(56) References Cited

U.S. PATENT DOCUMENTS

| | | |
|---|---|---|
| 2017/0374574 A1 | 12/2017 | Lee et al. |
| 2019/0380017 A1* | 12/2019 | Thangarasa ........... H04W 24/10 |
| 2020/0037186 A1* | 1/2020 | Thangarasa ........... H04L 1/1812 |
| 2020/0187151 A1* | 6/2020 | Wang ................. H04W 36/0058 |
| 2020/0213884 A1 | 7/2020 | Chen |
| 2021/0195654 A1* | 6/2021 | Lei ....................... H04B 17/327 |
| 2021/0345097 A1* | 11/2021 | Wu ......................... H04W 8/24 |
| 2023/0209420 A1* | 6/2023 | Xie ....................... H04W 36/32 |
| | | 370/332 |
| 2023/0337288 A1* | 10/2023 | Zhou ......................... H04L 1/08 |
| 2024/0008050 A1* | 1/2024 | Zhou .................. H04W 74/006 |

OTHER PUBLICATIONS

Extended European Search Report of European Application No. 20958054.7 dated Aug. 7, 2024, 12 pages.
LG Electronics "Measurement Gap Configuration and Measurement for MTC UEs" 3GPP TSG Ran WG1 Meeting #82, R1-154230, Aug. 23, 2015, 3 pages.

\* cited by examiner

METHOD, DEVICE, AND SYSTEM FOR CELL MEASUREMENT AND REPORT IN WIRELESS NETWORKS

CROSS-REFERENCE TO RELATED APPLICATION

This application is a continuation application of PCT International Patent Application No. PCT/CN2020/122322, filed with the China National Intellectual Property Administration, PRC on Oct. 21, 2020, which is herein incorporated by reference in its entirety.

TECHNICAL FIELD

This disclosure is directed generally to wireless communications, and particularly to methods, systems and devices for performing dynamically triggered cell measurements.

BACKGROUND

A User Equipment (UE) performs cell measurement periodically to identify suitable cells. Various network conditions may trigger to cell measurement. Frequent cell measurements may lead to excessive UE power consumption and also service interruption. It is critical to trigger a cell measurement in a manner that reduces the number of cell measurements while still meet cellular signal coverage requirement. The ability for a UE to send its cell measurement related information to the base station is another important factor to obtain optimal network performance, particularly for low power wireless terminals such as NarrowBand-Internet of Things (NB-IoT), Machine Type Communication (MTC) and enhanced Machine Type Communication (eMTC) devices.

SUMMARY

This disclosure is directed to methods, systems and devices for performing dynamically triggered UE cell measurements and reporting the cell measurement related parameters in wireless communication networks.

In some implementations, a method for a UE in a network to trigger a cell measurement by the UE is disclosed. The method may include receiving cell measurement triggering information from a first network element in the network, the cell measurement triggering information comprising a set of predetermined values for a UE parameter and a set of triggering conditions for cell measurements corresponding to the set of predetermined values; determining a current value of the UE parameter for the UE; identifying a cell measurement triggering condition among the set of triggering conditions based on the current value of the UE parameter for the UE and the cell measurement triggering information; determining if the cell measurement triggering condition is met by the UE; and in response to the cell measurement triggering condition being met, performing the cell measurement.

In some other implementations, a method for sending neighbor cell information, executed by a UE in a network is disclosed. The method may include sending a first message comprising the neighbor cell information to a first network element in the network.

In some other implementations, a method for sending UE capability information of a UE to a first network element in a network, executed by the UE in the network is disclosed. The method may include sending a first message comprising UE capability information to the first network element.

In some other implementations, a method for sending cell measurement assisting information to a first network element in a network, executed by a UE in the network is disclosed. The method may include sending a first message comprising the cell measurement assisting information to the first network element.

A network element and/or UE is further disclosed. The network element and/or UE includes a processor and a memory, wherein the processor is configured to read computer code from the memory to implement the method above. A computer-readable medium is further disclosed. The computer-readable medium includes instructions or a computer program which, when executed by a wireless terminal, cause the wireless terminal to carry out the method above.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Certain features are described using NB-IoT/eMTC wireless communication protocol as an example. However, applicability of the disclosed techniques is not limited to only NB-IoT/eMTC wireless communication protocol, and the disclosed implementations are applicable to any other types of wireless standards. Section headings are used in the present disclosure only to improve readability and do not limit the scope of the disclosed embodiments and techniques to each particular section.

Wireless Communication Network

Figure 1:
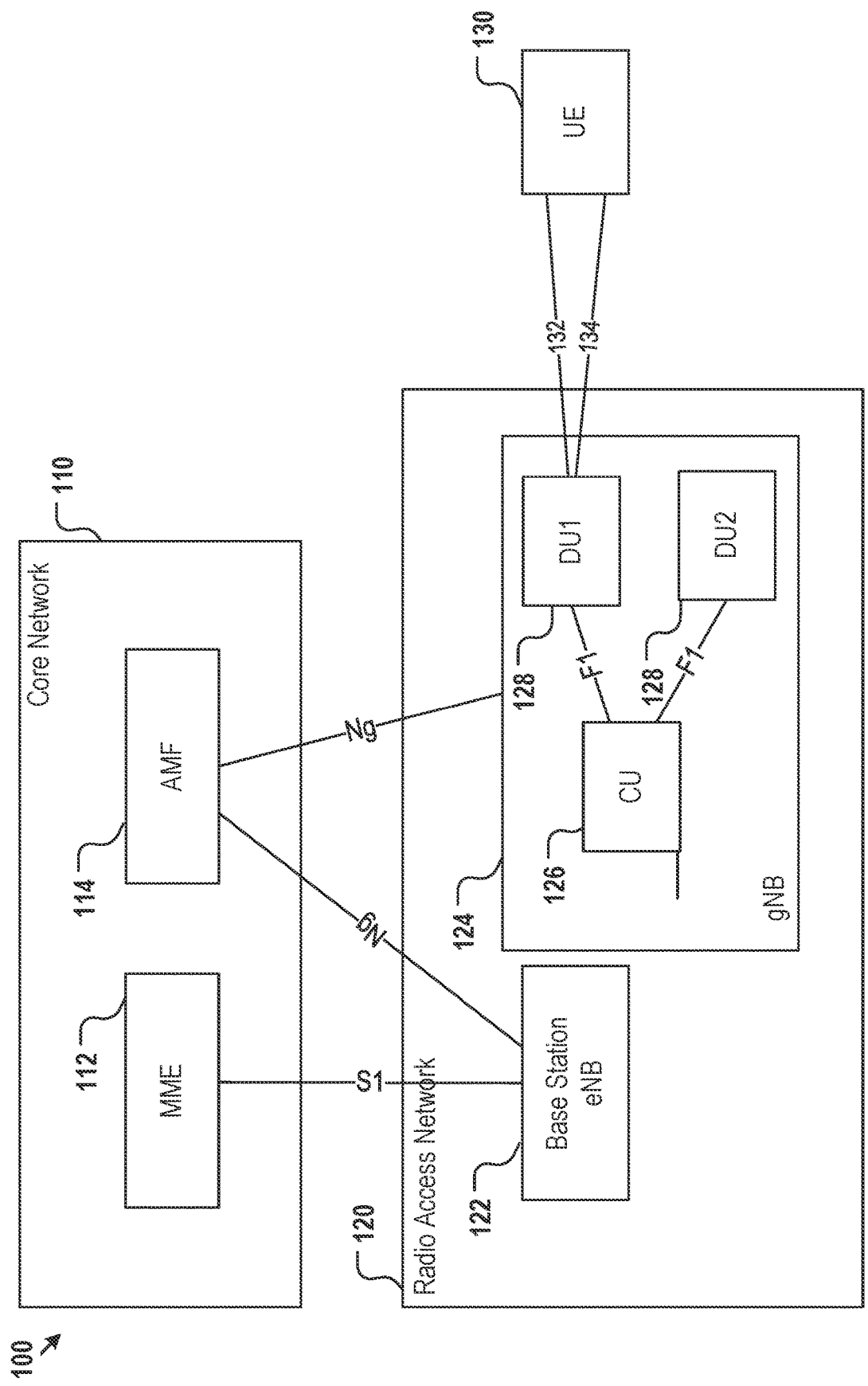
FIG. 1 shows an exemplary wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF) 114. Other functions that may be included in the core network 110 are not shown in FIG. 1. The RAN 120 further includes multiple base stations, for example, base stations (BS) 122 and 124. The base stations may include at least one evolved NodeB (eNB) 122 for 4G LTE, or a next generation NodeB (gNB) 124 for 5G New Radio (NR), or any other type of signal transmitting/receiving access device such as a UMTS NodeB. The example eNB 122 communicates with the MME 112 via an S1 interface. Both the eNB 122 and gNB 124 may connect to the AMF 114 via an Ng interface.

The gNB 124 may further include a central unit (CU) 126 and at least one distributed unit (DU) 128. The CU and the DU may be co-located in a same location, or they may be split in different locations. The CU 126 and the DU 128 may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may also include at least one User Equipment (UE) 130. The UE 130 may be implemented as mobile or fixed communication devices which are capable of accessing the wireless communication network 100. The UE 130 may include but is not limited to mobile phones, laptop computers, tablets, personal digital assistants, wearable devices, IoTNB-IoT devices, MTC/eMTC devices, distributed remote sensor devices, roadside assistant equipment, and desktop computers. The UE 130 may communicate with the base station through Over the Air (OTA) radio communication interface and resources. As shown in FIG. 1, the OTA interface may include multiple ratio carriers 132 and 134. A radio carrier may further be an anchor carrier or a non-anchor carrier. Each base station may further support at least one cell and a physical location may be covered by multiple cells. The UE130 may choose a best cell to camp on or connect to for wireless service.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB (even though, the base station 122 is labeled as an eNB and the base station 124 is labeled as gNB for illustration purposes).

While the description below focuses on cellular wireless communication systems as shown in FIG. 1, the underlying principles are applicable to other types of wireless communication systems supporting wireless devices. These other wireless systems may include but are not limited to Wi-Fi, Bluetooth, ZigBee, and WiMax networks.

Cell Measurement

In the wireless communication network 100, UEs, especially eMTC, NB-IoT devices are deployed in different areas under different level of cellular coverage. For example, UEs may be deployed in office buildings, warehouses, grocery stores, or underground parking lots. These locations may have different cellular signal quality.

An NB-IoT or eMTC device may be under the cellular coverage of multiple cells. While in idle mode, the device receives intra-frequency and inter-frequency neighbor cell information through the system information (SI). Periodically, the device performs measurement on its serving cell and neighbor cells (also refers to as neighboring cells), executes cell reselection procedure based on the cell measurement result, and then camps on a suitable cell. After moving into the RRC connected mode, the device performs the cell measurement on the serving cell periodically. However, the NB-IoT/eMTC device does not support measurement of the neighbor cells in RRC connected mode. One reason is that the NB-IoT/eMTC device may be static or moving in low speed, the channel quality of the neighbor cells changes slowly. The other reason is that the NB-IoT/eMTC device has stringent power consumption requirement and the periodical measurement drains too much power.

Figure 2:
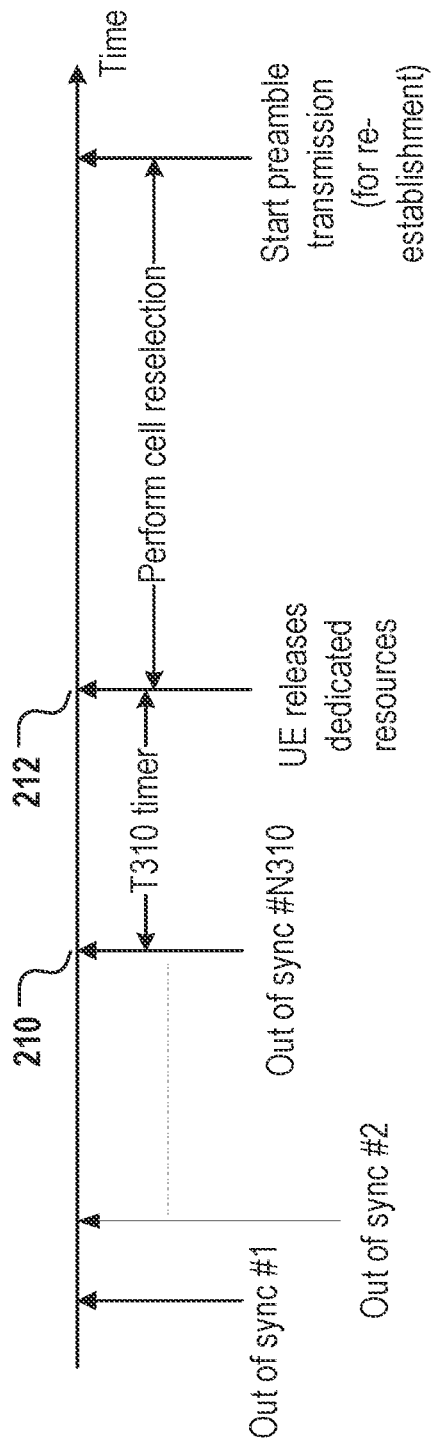
FIG. 2 shows an exemplary cell re-selection procedure.

Furthermore, in order to recover from deteriorated radio link promptly, the NB-IoT/eMTC device monitors and evaluates the quality of the radio link. The physical layer of the device evaluates the quality of the downlink signals in each evaluation period. If all the quality measurement results in the evaluation period are sub-optimal, an out of synchronization (out of sync) indication is sent to Radio Resource Control (RRC) of the device. If at least a certain amount of quality measurement results in the evaluation period is satisfactory, an in-sync indication is sent to the RRC. Referring to FIG. 2, at time moment 210, the RRC receives a predefined amount (N) of continuous out of sync indications, a timer T310 may be started. While the timer T310 is running, if the RRC layer of the UE (referred to as RRC for brevity) receives an in-sync indication, the timer T310 may be stopped. At time moment 212, the timer T310 expires, the RRC reestablishment procedure may be triggered. The device releases its current dedicated resources and starts cell selection. During the RRC reestablishment procedure, the device searches and measures the cells covering the area, and performs the cell selection procedure. If one cell satisfies the cell selection criterion, the device camps on it, reads the system information, and then triggers a transmission of the RRC reestablishment request message.

At least one issue of the above cell search/selection procedure is that the procedure takes too long. For example, the procedure may take about 1.4 seconds to 14.8 seconds. During this procedure, the device experiences service interruption. Hence, in order to shorten the delay of the RRC reestablishment procedure, the device may search and measure the neighboring cell before triggering the RRC reestablishment procedure. For example, the device may perform the intra-frequency and inter-frequency cell measurement periodically in RRC connected mode similarly as in idle mode. However, such periodic cell measurement would increase power consumption and some of these measurements would be unnecessarily made for the device having good channel quality.

Furthermore, if the device performs the intra-frequency and inter-frequency measurement too late, it may not finish the cell search and measurement for the neighbor cells before the RRC reestablishment request message is sent, causing the RRC reestablishment procedure to fail.

In one aspect of this disclosure, various techniques of triggering the intra-frequency and inter-frequency cell measurement are implemented to reduce UE power saving, decrease unnecessary cell measurement, yet still allow timely completion of the measurement of the neighbor cells.

UE Cell Measurement Information Report to Base Station

From the perspective of network performance and optimization, it is often beneficial for the base station and the UE to have a consistent view of the wireless signal measurement parameters. From time to time, however, the base station and the UE may have a different view on these parameters. For example, the base station may have its own information about the UE's candidate neighbor cells for the UE to measure. In some situation, the UE may find a best cell (not the serving cell) which is not listed in the neighbor cells provided by the base station. For another example, when the UE performs a cell measurement, it may encounter certain failure conditions and these failure conditions may be caused by a sub-optimal configuration on the base station side. The base station may indicate to the UE a wrong cell or frequency to measure, or the base station may give the UE an incomplete list of neighbor cells. As such, it may be beneficial for the UE to report cell measure information and failure information to the base station as a feedback, so the base station may make adjustment based on the feedback from the UE.

A base station may serve many different types of UEs each may have different capabilities, such as the capability to measure the intra-frequency or inter-frequency cell in RRC connected mode; the maximum number of neighbor cell that the UE can measure; or the maximum number of frequency that the UE can measure. If the base station has a precise view on the UE's capability, it may make a more informed recommendation for the UE. For example, the base station may send a customized decision or scheduling for a particular UE based on the UE's capability.

In another aspect of this disclosure, various embodiments are described to enable the UE to send assistant information such as cell measurement report, UE capability report, and failure information report to the base station.

Embodiment 1

In order to extend the cellular signal coverage, some technologies, such as NB-IoT/eMTC may be used. These technologies support various cellular coverage enhancement functions. Different cellular coverage condition may correspond to different coverage enhancement level (CEL). Different UEs may be in different coverage enhancement level (CEL).

For a UE at the cell edge, normally the channel quality is low. In a cellular coverage enhancement mode, the UE can repeat transmission of the signal to the base station multiple times, and the base station can also repeat the signal transmission to the UE many times, to meet the reception performance. Therefore, for the UE in the enhanced coverage, it may have to receive the downlink signals multiple times to achieve a successful reception. During the cell measurement, the UE in the enhanced coverage may take longer time to receive the signal from a neighbor cell, compared with a UE in normal coverage. In other words, the UE in the enhanced coverage mode needs more time to identify and measure a neighbor cell than a UE in normal coverage would. For example, a UE in the enhanced coverage may need at least 14.8s to identify a cell in a frequency and a UE in the normal coverage may need as little as 1.4s to identify a cell in a frequency.

For a UE in RRC connected mode, if:
the Reference Signal Received Power (RSRP) of its serving cell is lower than a RSRP threshold, or the repetition number of the reception of Physical Downlink Shared Channel (PDSCH), Physical Downlink Control Channel (PDCCH), or other downlink signals configured via Radio Resource Control (RRC) message or indicated via Downlink Control Information (DCI) by the base station is higher than a downlink signal threshold; or
the repetition number of the transmission of Physical Uplink Shared Channel (PUSCH), or Physical Uplink Control Channel (PUCCH), or other uplink signals configured via RRC message or indicated via DCI by the base station is higher than an uplink signal threshold, then the UE is set to be in the enhanced coverage mode. Alternatively, the UE may be configured into the enhanced coverage mode via RRC message or DCI by the base station. The UE in the enhanced coverage has a corresponding RSRP range. Furthermore, the enhanced coverage can be divided into multiple coverage levels each with a corresponding RSRP range. Each coverage level represents one range of coverage and uses one corresponding coverage enhancement function. For example, the RSRP of UE in coverage level 2 or RSRP range 2 has lower RSRP value than coverage level 1 or RSRP range 1. UE in coverage level 2 or RSRP range 2 needs more repetitions of transmission than coverage level 1 or RSRP range 1.

The coverage level (or RSRP range) of the UE can be obtained by the UE's RSRP of its serving cell, or the number of repetitions of transmission of PDSCH or PDCCH as configured by the RRC or DCI. The coverage level (or RSRP range) of the UE may also be configured by the base station.

In some implantations, as an example, the coverage level may be determined as shown in Table 1:

TABLE 1

| RSRP Value of UE | Coverage Level |
| --- | --- |
| RSRP threshold 2 < RSRP < RSRP threshold 1 | 1 |
| RSRP < RSRP threshold2 | 2 |

The concept for determining the coverage level based on repetition transmission count is similar, using various repetition number thresholds.

In some implementations, for a UE under normal coverage, it may also be assigned a coverage level, for example, normal coverage may be assigned to coverage level 0. The determination of normal coverage be based on normal RSRP or repetition number thresholds. For example, if the RSRP value of the UE is higher than threshold 1, the UE may be set in normal mode.

For a UE in RRC connected mode, the condition for triggering the intra-frequency or inter-frequency cell measurement need to satisfy the requirement that UE can complete the identification of the neighbor cells before triggering an RRC reestablishment procedure. As described above, since the time needed to complete the identification of a cell is different for UEs in different coverage levels (e.g., coverage level 1, coverage level 2, or normal/coverage level 0), the condition for triggering the intra-frequency or inter-frequency cell measurement for these UEs should also be different to accommodate the different coverage levels.

The intra-frequency or inter-frequency cell measurements for UE may be triggered under various conditions. For example, a starting of a T310 timer may trigger the cell measurements. For another example, the cell measurements may be triggered when the RRC at the UE receives continuous N out of sync indications (N is predefined). For yet another example, the cell measurements may be triggered when RSRP of its serving cell is lower than a predefined threshold. Other conditions may also be used to trigger the cell measurements. Further, similar or different conditions may be used for different coverage levels. For example, for the UE in the normal coverage, like some other enhanced coverage levels, the cell measurements may be similarly triggered when the RRC of the UE receives continuous N out of sync indications, where N may be predefined or configured by the base station. Likewise, different UE in different coverage levels may correspond to different triggering conditions.

The base station may send multiple conditions for triggering the intra-frequency or inter-frequency cell measurement to the UE by broadcast in system information (SI) or using an RRC message. Each triggering condition corresponds to one coverage level or RSRP range. The UE can choose one condition based on its own coverage level (or RSRP range). If UE determines that the chosen triggering condition is met, the measurement is triggered. For example, the base station may send a list of conditions of triggering the intra-frequency or inter-frequency measurement (via SI or RRC message) having two conditions in the list, e.g., condition 1 and condition 2. For example, the condition 1 may correspond to a starting of a T310 timer and the condition 2 corresponds to a reception of a first out of sync indication by the RRC of the UE. Each condition corresponds to one coverage level. Table 2 shows an example mapping between the coverage levels and cell measurement triggering conditions.

TABLE 2

| Coverage Level | Triggering Condition |
|---|---|
| 1 | Condition 1: a T310 timer is started |
| 2 | Condition 2: RRC receives a first out of sync indication |

As such, the UE may be able to choose a cell measurement triggering condition based on its own coverage level and the example mapping above.

The triggering conditions above may be carried by a data item in a message communicated between the base station and UE and the data item may be interpreted by the UE to extract and understand the triggering conditions. In some alternative implementations, each triggering condition may be communicated as multiple data items or data fields. For example, a triggering condition may be separated into a triggering entity and a threshold value or value range corresponding to the triggering entity. The threshold values or ranges may be optional. In other words, some triggering entities may not be associated with any threshold values or ranges. For example, a triggering condition involving a starting of the T310 timer may not be associated with any threshold value or range. Specifically, if the triggering condition is a timer without any threshold, the UE is triggered to perform cell measurement when the specified timer starts, or the UE is instructed to start the specified timer and then perform the cell measurement upon the starting of the timer. Table 3 below shows example triggering entities and their threshold values or ranges for different cell coverage levels.

TABLE 3

| Coverage Level | Triggering Condition | Triggering Entity | Triggering Threshold (optional) |
|---|---|---|---|
| 1 | Condition 1: RSRP less than a threshold value t1 | RSRP | Threshold value t1 |
| 2 | Condition 2: RRC receives N out of sync indication | A count of RRC receives continuous out of sync indication | N |

In some implementations, for each coverage level, there may be multiple triggering conditions and the UE may trigger the cell measurement when all the triggering conditions are met. For example, multiple conditions for triggering a cell measurement may include the RRC receiving continuous N out of sync indications and the RSRP value being lower than an RSRP threshold. In these implementations, each coverage level may correspond to a list of triggering conditions.

Embodiment 2

As an extension to embodiment 1, a base triggering condition is introduced in this embodiment. The base triggering condition (also referred to as common triggering condition) needs to be checked by the UE regardless of its own coverage level. When there is a base triggering condition, the UE needs to check both the base triggering condition and its coverage level specific triggering condition.

The base station may send the base trigger condition along with coverage level specific triggering condition to the UE by broadcast in system information (SI) or using RRC message. UE chooses one coverage level specific condition based on its own coverage level or RSRP range. If both the base condition and coverage level specific condition are met, the cell measurement is triggered. For example, there may be one base triggering condition and three coverage level specific conditions for triggering the intra-frequency or inter-frequency cell measurement: base condition, coverage level specific condition 1, 2, and 3.

For example, the base condition may be that the RSRP value is lower than an RSRP threshold; the coverage level specific condition for coverage level 1 may be empty; the coverage level specific condition for coverage level 2 may be that RRC receives a first out of sync indication; and the coverage level specific condition for coverage level 3 may be a starting of the T310 timer. When a particular coverage level specific condition is empty, the UE under the particular coverage level only needs to meet the base triggering condition.

In some implementation, there may be multiple base triggering conditions. All of them need to be met for triggering cell measurements.

Embodiment 3

The base station may enable different triggering condition via RRC message on different UEs. In an RRC message, there may be multiple triggering conditions. And the base station may enable one of them for a UE. For example, there may be two conditions: condition 1 that a T310 timer is started, and condition 2 that RSRP value of the UE is lower than a threshold. For the UE, the RRC message to it may enable the condition 1. If a T310 timer is started, UE performs the intra-frequency or inter-frequency measurement.

Embodiment 4

In embodiment 1, the cell measurement triggering condition is dynamically determined by the coverage level of the UE. In this embodiment, a similar approach is taken but the Discontinuous Reception (DRX) cycle of the UE is used to determine the cell measurement triggering condition.

In order to save UE power consumption, some technologies, for example NB-IoT/eMTC, can support the extended DRX (eDRX). For UE with light traffic, it may be configured with eDRX. In the eDRX mode, the UE has longer DRX cycle, and monitors downlink signals after a long period of inactivity. For cell measurement, the UE also takes longer times to identify and measure a neighbor cell to decrease power consumption. In other words, for a UE with longer DRX cycle, the measurement takes longer times to identify and measure a neighbor cell, than a UE with shorter DRX.

For a UE in RRC connected mode, the condition for triggering the intra-frequency or inter-frequency cell measurement need to satisfy the requirement that the UE can complete the identification of the neighbor cells before triggering a RRC reestablishment procedure. As described above, since the time needed to complete the identification of a cell is different for UEs configured with different DRX cycle, the condition for triggering the intra-frequency or inter-frequency cell measurement for these UEs may also be different to accommodate the different DRX cycle.

As such, based on the DRX cycle of the UE, the UE may determine a DRX cycle specific cell measurement triggering condition. Examples are shown in Table 4.

TABLE 4

| DRX Cycle (T) | Triggering Condition | Triggering Entity | Triggering Threshold (optional) |
|---|---|---|---|
| Threshold T1 <= T | Condition 1: RSRP less than a threshold value t1 | RSRP | Threshold value t1 |
| Threshold T2 <= T < Threshold T1 | Condition 1: RSRP less than a threshold value t2 | RSRP | Threshold value t2 |
| T < Threshold T2 | Condition 3: RRC receives N out of sync indication | A count of RRC receives continuous out of sync indication | N |

As shown in Table 4, each DRX Cycle belongs to a DRX range, and each range corresponds to a triggering condition. Each range is defined by thresholds such as T1 and T2 of Table 4. The thresholds T1 and T2 may be predefined, or may be configured by the base station.

In some implementation, the DRX Cycle may be used directly to indicate the triggering condition. There is no limitation on how the DRX Cycle is used to indicate the triggering condition. In one example, a correspondence or mapping between DRX cycle and triggering conditions may be predefined.

It is to be understood that the principles in embodiment 1 and embodiment 2 also apply to this embodiment. For example, the base triggering condition may also apply in embodiment 4.

Embodiment 5

A communication service provider may get some information about the network configuration, deployment and topology parameters such as cell information including frequency and neighbor cells of a cell. The base station may acquire these information via the Operation Administration and Maintenance (OAM) platform. If the base station can provide the neighbor cells information to the UE, the UE may measure the given neighbor cells instead of all the neighbor cells to decrease the power and resource consumption. Within a cell, the cell edge area may be in the coverage area of the cell itself and different neighbor cells. It may be more effective if the base station supplies the information about neighbor cells which cover the UE.

Figure 3:
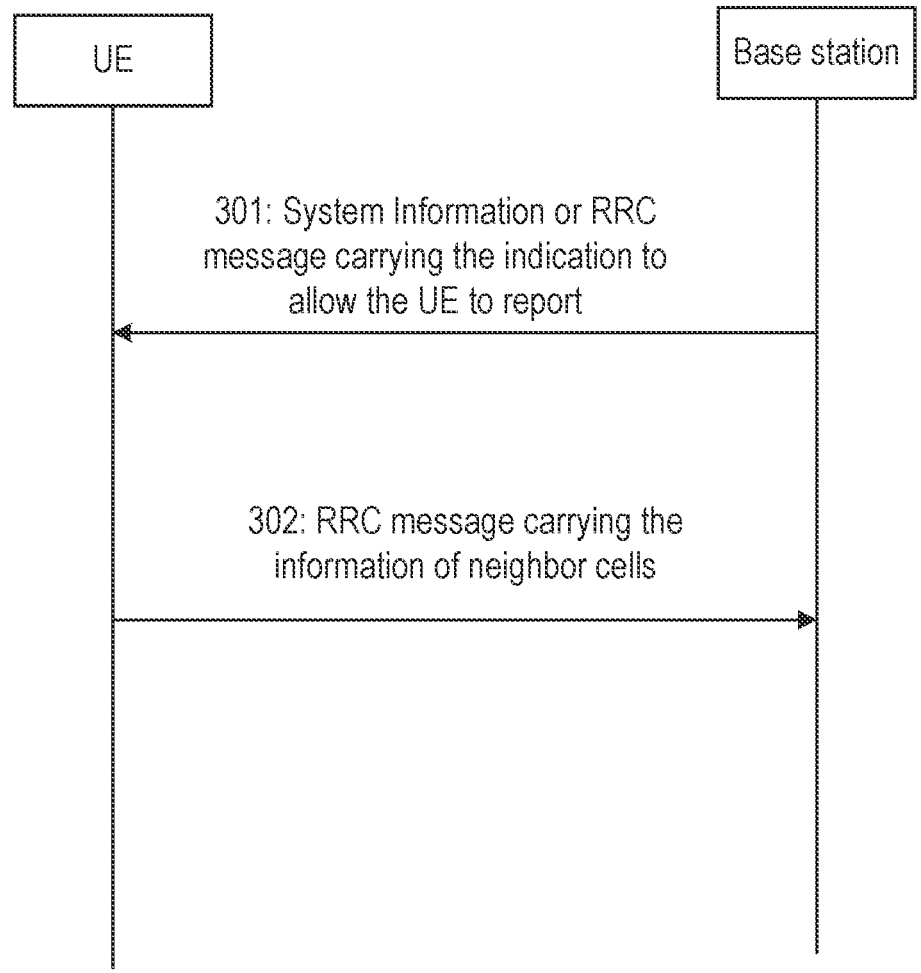
FIG. 3 shows an exemplary message flow for a UE to send cell information to a base station.

In order to help the base station to determine the neighbor cells that cover the UE, the UE may supply some information about its location. The base station may determine the neighbor cells of the UE based on the previous reported information, assuming that the UE is static or in low moving speed mode (e.g., NB-IoT or eMTC device). Referring to FIG. 3, at step 301, the base station may broadcast in system information or sends an RRC message to the UE to indicate whether the UE in the cell is allowed to report the information about neighboring cell to the base station, or whether the UE in the cell is allowed to report the best cell (not the serving cell) measured in its RRC idle mode, whether the UE in the cell is allowed to report the best cell (not the serving cell and the source cell) measured in its RRC connected mode, or whether the UE is allowed to report the suggest neighbor cell configuration, or whether the UE in the cell is allowed to measure the intra-frequency or inter-frequency cell in RRC connected mode, or the like.

At step 302, the UE may send the information of a list of neighbor cells or a best neighbor cell in an RRC message to the base station. The information may include the cell identify and frequency information of the neighbor cell.

The cell identify may include physical cell identify, global cell identify, or cell index that is broadcast in system information or configured in an RRC message, or the like.

The frequency information may include the frequency or frequency index that is broadcast in system information or configured in an RRC message, or the like.

The neighbor cell may include at least one of: the cell that UE gets the best measurement result in its idle mode, the cells that UE have identified in idle mode, or the cells that UE with measurement result that is higher than a threshold or satisfy the cell selection criterion in idle mode.

The RRC message may include at least one of:
an RRCReestablishmentRequest;
an RRCReestablishmentComplete message;
an RRCResumeRequest message;
an RRCResumeComplete message;
an RRCSetupRequest message; or
an RRCSetupComplete message.

Embodiment 6

In a wireless communication networks, different UE may have different capability. For example, some UEs can measure the intra-frequency or inter-frequency in RRC connected mode, but some UEs cannot. As such, the base station should know the UE's capability and then determine the cell measurement configuration for the UE.

Solution 1

Figure 4A:
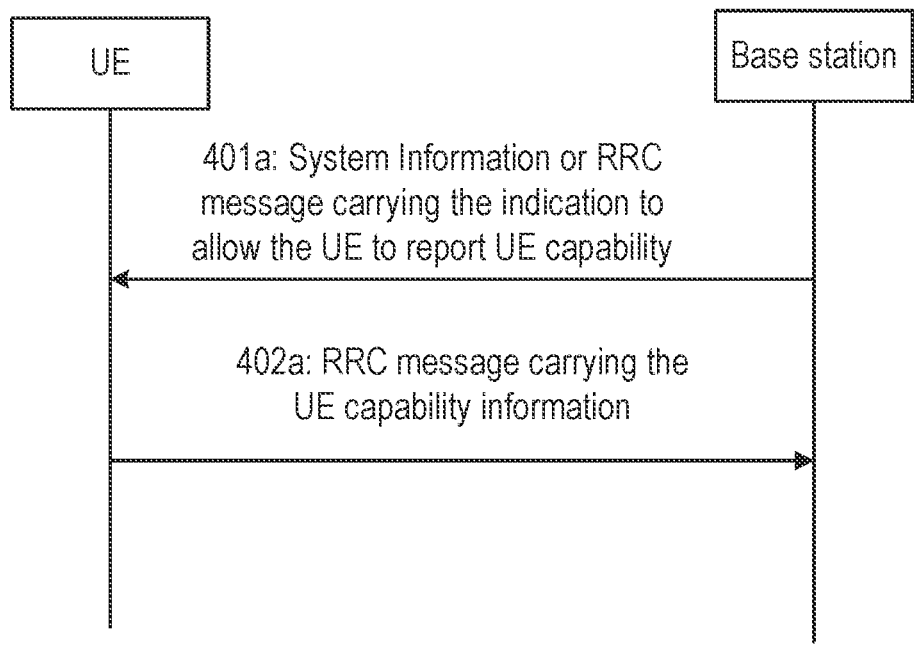
FIG. 4a shows an exemplary message flow for a UE to send UE capability to a base station.

One solution is for the UE to send the UE capability in an RRC message. Referring to FIG. 4a, in step 401a, the base station may broadcast in system information or sends an RRC message to the UE to indicate whether the UE in the cell is allowed to report the information about UE capability to the base station, or whether the UE in the cell is allowed to measure the intra-frequency or inter-frequency in RRC connected mode, or the like. With the permission from the base station, in step 402a, the UE may report the information about UE capability using an RRC message. The UE capability information at least one of:
a UE capability to measure the intra-frequency or inter-frequency cell in RRC connected mode;
a maximum number of neighbor cell that the UE can measure; or
a maximum number of frequency that the UE can measure.

The RRC message for sending UE capability information may include at least one of:
an RRCReestablishmentRequest message;
an RRCReestablishmentComplete message;
an RRCResumeRequest message;

an RRCResumeComplete message;
an RRCSetupRequest message; or
an RRCSetupComplete message.

Solution 2

Alternatively, the UE may request to measure the intra-frequency or inter-frequency cell in RRC connected mode using an RRC message.

Figure 4B:
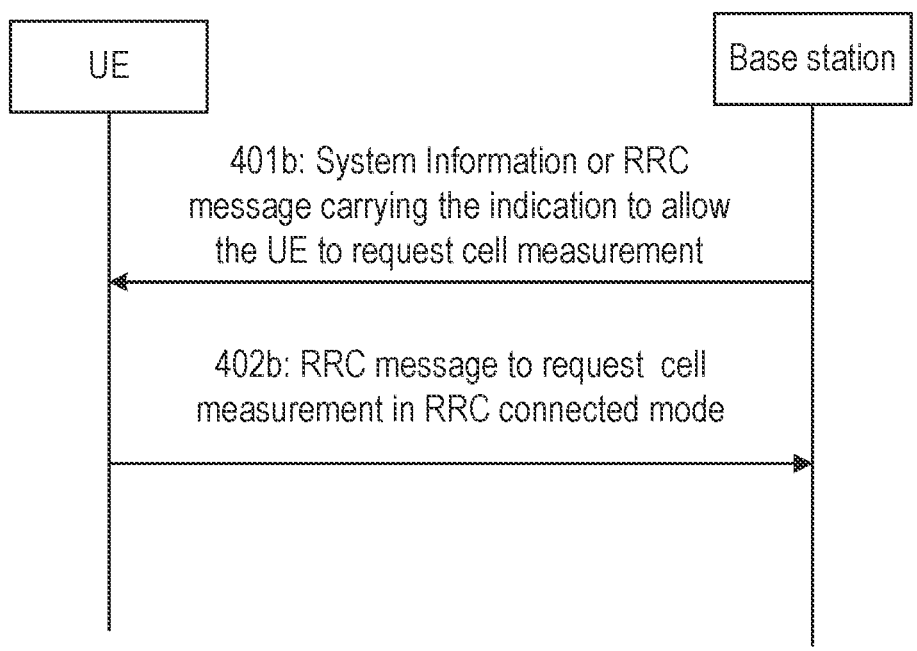
FIG. 4b shows another exemplary message flow for a UE to send UE capability to a base station.

Referring to FIG. 4b, in step 401b, the base station may broadcast in system information or sends an RRC message to the UE to indicate whether the UE in the cell is allowed to request to measure the intra-frequency or inter-frequency in RRC connected mode.

If UE has the capability to measure the intra-frequency or inter-frequency in RRC connected mode, or the UE satisfies some conditions, it can request the base station to grant permission to perform cell measurement using an RRC message in step 402b. The condition may include at least one of:
- a mobility speed of UE is higher than a first predefined threshold;
- an RSRP or Reference Signal Received Quality (RSRQ) of a serving cell of the UE is lower than a second predefined threshold;
- a difference between the RSRP of the serving cell of the UE and an RSRP of a neighbor cell of the UE is lower than a third predefined threshold;
- a difference between the RSRQ of the serving cell of the UE and an RSRQ of a neighbor cell of the UE is lower than a fourth predefined threshold;
- the RSRP of the serving cell is lower than the RSRP of the neighbor cell by a fifth predefined threshold;
- the RSRQ of the serving cell is lower than the RSRQ of the neighbor cell by a sixth predefined threshold; or
- the UE predicts a traffic volume of the UE to be lower than an seventh predefined threshold.

The RRC message may include at least one of:
an RRCReestablishmentRequest message;
an RRCResumeRequest message;
an RRCSetupRequest message; or
a new message.

The RRC message may carry the information about the UE capability, which include at least one of:
- a UE capability to measure the intra-frequency or inter-frequency cell in RRC connected mode;
- a maximum number of neighbor cell that the UE can measure; or a maximum number of frequency that the UE can measure.

The RRC message may further carry at least one:
number of neighbor cell requested to measure;
number of frequency requested to measure;
Public Land Mobile Network (PLMN) that measured cell belongs to;
neighbor cells requested to measure;
frequency requested to measure; or
time moment to perform measurement.

After the base station receives this RRC message, the base station may configure the UE with the cell measurement triggering condition to trigger the intra-frequency or inter-frequency cell measurement, the neighbor cells to measure, or the frequencies to measure, or the like.

Optionally, the conditions described in solution 2 may also be applied to solution 1 of this embodiment. When the UE satisfies these conditions, the UE sends the UE capability information to the base station.

Optionally, the UE capability information described in solution 2 may also be applied to solution 1 of this embodiment.

Embodiment 7

The base station may broadcast in system information or send and an RRC message to the UE with the neighbor cells and the frequencies for the UE to measure, to assist the UE to reduce the cell measurement load. The UE performs measurement on the frequencies and neighbor cells sent by the base station. However, the base station may occasionally send wrong or incomplete cells or frequencies for the UE to measure, considering that the base station may make wrong judgement on the location and speed of the UE. As a result, the UE may not find a suitable cell whose RSRP or RSRQ is higher than a threshold in RRC connected mode. If the UE triggers a RRC reestablishment procedure, the UE has to perform the initial cell selection due to the absent of suitable cell. As such, the measurement in RRC connected mode may not identify a suitable cell, and increases the power consumption.

Figure 5A:
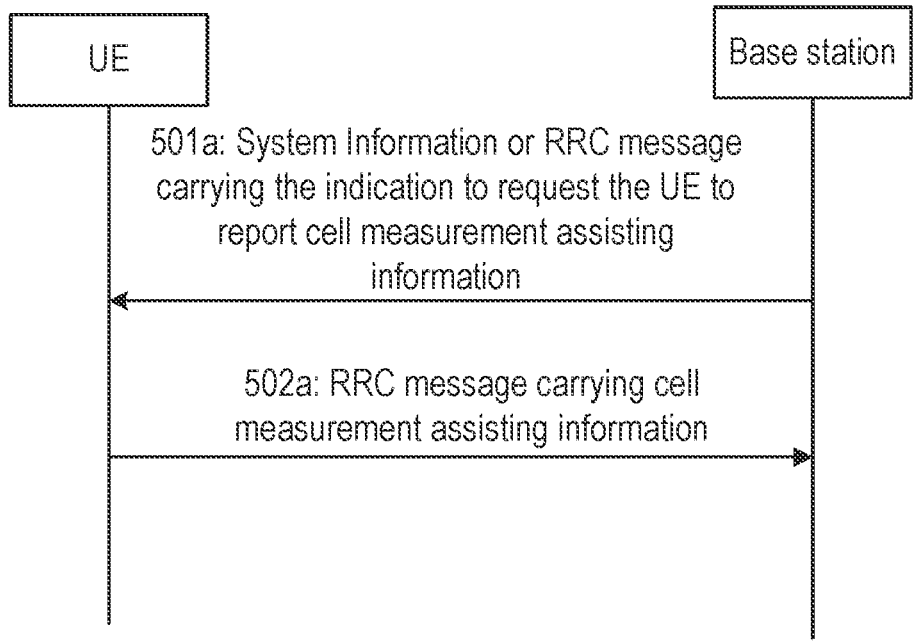
FIG. 5a shows an exemplary message flow for a UE to send cell measurement assistant information to a base station.
Figure 5B:
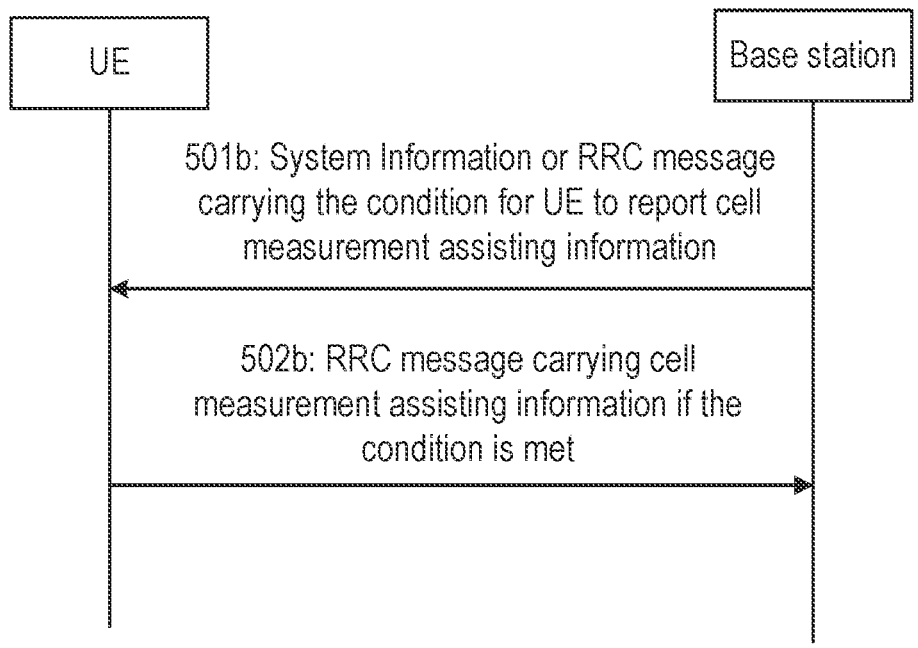
FIG. 5b shows another exemplary message flow for a UE to send cell measurement assistant information to the base station.

In order to optimize the cell configuration and reduce wrong information in the base station, the UE can report the information about the failure to the base station. The failure may be used as cell measurement assisting information, to help the base station to optimize or tune its configuration. Referring to FIG. 5a, in step 501a, the base station may broadcast in system information or configure in RRC message to request the UE or allow the UE to report the information about the failure or failure reason. Additionally, as shown in FIG. 5b, in step 501b, the base station may broadcast in system information or configure in RRC message the condition for the UE to report the information about the failure or failure reason. The RRC message may include UE Information Request message, or the like.

The condition for the UE to report the cell measurement assisting information include at least one of:
- cell measurement failure number exceeds a first predefined threshold;
- RSRP value is lower than a second predefined threshold;
- a timer is started;
- n amount of out of sync indication received by an RRC of the UE reaches a third predefined threshold; or
- a measurement configuration received from the first network element is not desired.

The cell measurement assisting information includes at least one of:
- the UE fails to find a suitable cell according to a measurement result measured in RRC connected mode during a cell selection after triggering a RRC reestablishment procedure;
- the UE fails to find a suitable cell in an intra-frequency or an inter-frequency cell measurement;
- the UE selects a cell during a RRC reestablishment procedure different than a neighbor cell that UE measures in RRC connected mode; or
- the UE selects a cell in a frequency different than the intra-frequency or the inter-frequency that UE measures in RRC connected mode.

In the failure cases above, the UE performs the cell measurement in RRC connected mode, but the UE fails to find a suitable cell, which may be an indication that the configuration of cell measurement may be incorrect or inaccurate.

The cell measurement assisting information may further includes at least one of:
- the UE fails to finish a cell measurement before triggering a RRC reestablishment procedure;
- the UE finishes the measurement too early before triggering a RRC reestablishment procedure; or a condition of triggering an intra-frequency or an inter-frequency cell measurement is too late or too early.

In failure cases above, if the cell measurement is triggered too late, UE may not finish the cell measurement. If cell measurement is triggered too early, the measurement result may be invalid or incomplete for the cell selection during the RRC reestablishment. These failures may further cause the UE to perform repetitive measurements which leads to more power consumption. These failures may indicate that the configuration of cell measurement maintained by the base station may be incorrect or inaccurate.

As shown in step 502a in FIG. 5a, or step 502b in FIG. 5b, the UE may send the cell measurement assisting information to the base station use an RRC message includes at least one of:

a UE Information Response message;
an RRC reestablishment request message; or
an RRC reestablishment complete message.

The cell measurement assisting information may further includes at least one of:

a best cell based on measurement result of the UE;
a cell identify and frequency of a neighbor cell that UE performs a cell measurement in RRC connected mode;
a suggestion on cell measurement triggering condition; or
a time moment that the UE finishes the cell measurement Once the base station receives those cell measurement assisting information, the base station may fix or tune its measurement configuration based on the cell measurement assisting information to derive a more accurate neighbor cell configuration, or a more desirable condition for triggering the UE to measure the intra-frequency or inter-frequency in RRC connected mode, so there is enough time for the UE to identify a cell and get the measurement result.

Embodiment 8

A UE in the enhanced coverage may need more time to identify and measure a neighbor cell than a UE in normal coverage. For example, the UE in the enhanced coverage may need at least 14.8s to identify a cell in a frequency. On the other hand, the UE in the normal coverage may need as little as 1.4s to identify a cell in a frequency. The UE in the enhanced coverage needs more measurement occasions than the UE in normal coverage.

There are multiple kinds of measurement occasions, for example, a PDCCH gap that is determined by a PDCCH period and a PDCCH transmission repetition number; a DL PDCCH duration gap that is determined by PDCCH duration coeff, a period, and a DRX inactive duration. More occasions leads to more power consumption on a UE. It is unnecessary to enable all kinds of measurement occasions for all the UEs, unless the measurement could be finished before RRC reestablishment. As such, the measurement occasions are different for UEs in different coverage.

The base station may broadcast in system information or configure in RRC message multiple kinds of measurement occasions. Each kind of the measurement occasions corresponds to one or multiple coverage or coverage level or RSRP range. The UE may choose one condition based on its own coverage level or RSRP range. For example, the base station may broadcast or configure a list of measurement occasions for inter-frequency measurement. There may be two kinds of measurement occasions: occasion 1, occasion 2. For example, the occasion 1 may be a PDCCH gap. The occasion 2 may be a DRX inactive duration. Each kind of measurement occasions corresponds to one or multiple coverage level: the occasion 1 is corresponding to the normal coverage or RSRP range 1 and enhanced coverage or RSRP range 2. And the occasion 2 is corresponding to the enhanced coverage or RSRP range 2. If the UE is in enhanced coverage or RSRP range 2, it chooses the occasion 1 and occasion 2, and the UE performs inter-frequency measurement on those occasions.

Alternatively, the base station may enable different kind of measurement occasions via RRC message on different UEs. In the RRC message, there may be multiple kinds of measurement occasions. And the base station may enable some or all of them for a UE. For example, there may be two kinds of occasions: occasion 1 that is a PDCCH gap, occasion 2 that is a DRX inactive duration. For UE 1, the RRC message to it enables the occasion 1. UE 1 performs inter-frequency measurement on PDCCH gaps. And for UE 2, the RRC message to it enables both the occasion 1 and occasion 2. UE 2 performs inter-frequency measurement on PDCCH gaps and DRX inactive duration.

To summarize, the disclosure above describes a method and system for dynamically triggering cell measurements. A UE may determine a cell measurement triggering condition based on its coverage level, or DRX cycle. The dynamic cell measurement triggering condition helps reducing UE power consumption and improve cell selection/re-selection.

This disclosure also describes a mechanism for the UE to report its capability, cell measurement information, and cell measurement assisting information to the base station. These information may be used by the base station to optimize the network performance.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for a UE in a network to trigger a cell measurement by the UE, the method comprising:
   receiving cell measurement triggering information from a first network element in the network, the cell measurement triggering information comprising a list of cell measurement triggering configurations, each entry in the list of cell measurement triggering configurations comprising a mapping from a predetermined value for a UE parameter to a triggering condition for cell measurement, wherein the UE parameter comprises one of:
      a Coverage Enhancement Level (CEL); or
      a Discontinuous Reception (DRX) cycle parameter;
   determining a current value of the UE parameter for the UE;
   identifying a cell measurement triggering condition based on the current value of the UE parameter according to the mapping in the list of cell measurement triggering configurations;
   determining if the cell measurement triggering condition is met by the UE; and
   in response to the cell measurement triggering condition being met, performing the cell measurement.

2. The method of claim 1, wherein the UE parameter comprises the CEL and wherein determining the current value of the UE parameter for the UE comprises:
   obtaining a reference signal received power (RSRP) of a serving cell of the UE; and
   determining the CEL for the UE based on the RSRP and based on one of:
      a predefined coverage RSRP threshold; or
      a predefined coverage RSRP range.

3. The method of claim 1, wherein the UE parameter comprises the CEL and wherein determining the current value of the UE parameter for the UE comprises:
   obtaining a repetition transmission number of Physical Downlink Shared Channel (PDSCH) or Physical Downlink Control Channel (PDCCH) based on a Radio Resource Control (RRC) message sent from the first network element, or based on a Downlink Control Information (DCI) sent from the first network element; and
   determining the CEL for the UE based on the repetition transmission number and based on one of:
      a predefine first repetition transmission number threshold; or
      a predefine first repetition transmission number range.

4. The method of claim 1, wherein the UE parameter comprises the DRX cycle parameter and wherein determining the current value of the UE parameter for the UE comprises:
   determining the DRX Cycle parameter based on a DRX cycle of the UE and based on one of:
      a predefine DRX cycle threshold; or
      a predefine DRX cycle range.

5. The method of claim 1, wherein:
   the cell measurement triggering information further comprises a base cell measurement triggering condition; and
   before determining the current value of the UE parameter for the UE, the method further comprises determining if the base cell measurement triggering condition is met.

6. The method of claim 1, wherein:
   receiving the cell measurement triggering information from the first network element comprises:
      receiving one of an RRC message or a System Information (SI) message from the first network element; and
      extracting the cell measurement triggering information from the RRC message or the System Information message; and
   the first network element comprises at least one of:
      an enhanced NodeB (eNB);
      a new generation NodeB (gNB); or
      an enhanced Machine Type Communication (eMTC) NodeB.

7. A device comprising a memory for storing computer instructions and a processor in communication with the memory, wherein the processor, when executing the computer instructions, is configured to implement a method of claim 1.

8. A method for sending neighbor cell information, executed by a UE in a network, the method comprising:
   determining whether the UE is allowed to send the neighbor cell information to a first network element in the network; and
   when it is determined that the UE is allowed to send the neighbor cell information to the first network element:
      obtaining the neighbor cell information associated with at least one neighbor cell; and
      sending a first message comprising the neighbor cell information to the first network element in the network.

9. The method of claim 8, wherein determining whether the UE is allowed to send the neighbor cell information to the first network element comprises:
   receiving a second message from the first network element, the second message comprising a neighbor cell information report permission indicator for the UE; and determining whether the UE is allowed to send the neighbor cell information to the first network element based on the neighbor cell information report permission indicator.

10. The method of claim 8, wherein obtaining the neighbor cell information associated with the at least one neighbor cell comprises:
   selecting the at least one neighbor cell, if a cell measurement result of the at least one neighbor cell is higher than a predefined threshold, or the cell measurement result satisfies a predefined cell selection criterion; and
   obtaining the neighbor cell information associated with the selected at least one neighbor cell.

11. The method of claim 8, wherein obtaining the neighbor cell information associated with at least one neighbor cell comprises:
   selecting the at least one neighbor cell, if the at least one neighbor cell has a best cell measurement result; and
   obtaining the neighbor cell information associated with the selected at least one neighbor cell.

12. The method of claim 8, wherein:
   the neighbor cell information comprises at least one of:
      a cell identity; or
      cell frequency information;
   the cell identity comprises at least one of:
      a physical cell identity;
      a global cell identity; or
      a cell index; and
   the cell frequency information comprises at least one of:
      a cell frequency; or
      a frequency index.

13. The method of claim 8, wherein:
   the first message comprises at least one of:
      an RRCReestablishmentRequest;
      an RRCReestablishmentComplete message;
      an RRCResumeRequest message;
      an RRCResumeComplete message;
      an RRCSetupRequest message; or
      an RRCSetupComplete message; and
   the first network element comprises at least one of:
      an eNB;
      a gNB; or
      an eMTC NodeB.

14. A device comprising a memory for storing computer instructions and a processor in communication with the memory, wherein the processor, when executing the computer instructions, is configured to implement a method of claim 8.

15. A method for sending UE capability information of a UE to a first network element in a network, executed by the UE in the network, the method comprising:
   determining whether the UE is allowed to send the UE capability information to the first network element based on following conditions:
      a UE report permission indicator; and
      whether at least of following condition is met:
         a mobility speed of UE is higher than a first predefined threshold;
         a difference between the RSRP of the serving cell of the UE and an RSRP of a neighbor cell of the UE is lower than a second predefined threshold;
         a difference between the RSRQ of the serving cell of the UE and an RSRQ of a neighbor cell of the UE is lower than a third predefined threshold;
         the RSRP of the serving cell is lower than the RSRP of the neighbor cell by a fourth predefined threshold;
         the RSRQ of the serving cell is lower than the RSRQ of the neighbor cell by a fifth predefined threshold; or
         the UE predicts a traffic volume of the UE to be lower than a sixth predefined threshold; and
   sending a first message comprising the UE capability information to the first network element when it is determined that the UE is allowed to send the UE capability information to the first network element.

16. The method of claim 15, wherein determining whether the UE is allowed to send the UE capability information to the first network element comprises:
   receiving a second message from the first network element, the second message comprising the UE report permission indicator; and
   determining whether the UE is allowed to send the UE capability information to the first network element based on the UE report permission indicator.

17. The method of claim 15, wherein:
   the UE capability information comprises at least one of:
      a UE capability to measure an intra-frequency cell or an inter-frequency cell in RRC connected mode;
      a maximum number of neighbor cell that the UE can measure; or
      a maximum number of frequency that the UE can measure; and
   the first message comprises at least one of:
      a number of neighbor cell requested to measure;
      a number of frequency requested to measure;
      a Public Land Mobile Network (PLMN) that measured cell belongs to;
      a neighbor cells requested to measure;
      a frequency requested to measure; or
      a time moment to perform measurement.

18. The method of claim 15, wherein after the first message is sent to the first network element, the first network element is configured to perform at least one of determining:
   a cell measurement triggering condition for the UE;
   a neighbor cell for the UE to measure; or
   a frequency for the UE to measure.

19. A device comprising a memory for storing computer instructions and a processor in communication with the memory, wherein the processor, when executing the computer instructions, is configured to implement a method of claim 15.

* * * * *